United States Patent [19]

Shishikura et al.

[11] Patent Number: 4,544,615
[45] Date of Patent: Oct. 1, 1985

[54] BATTERY HAVING ELECTRODE MADE OF POLYMERIC COMPOUND HAVING CONJUGATED DOUBLE BONDS

[75] Inventors: Toshikazu Shishikura; Hiroshi Konuma, both of Yokohama; Hidenori Nakamura, Kawasaki; Yukio Kobayashi, Setagaya, all of Japan

[73] Assignees: Showa Denko Kabushiki Kaisha; Hitachi, Ltd., both of Tokyo, Japan

[21] Appl. No.: 606,749

[22] Filed: May 3, 1984

[30] Foreign Application Priority Data

May 4, 1983 [JP] Japan .................. 58-77509
May 4, 1983 [JP] Japan .................. 57-77510

[51] Int. Cl.⁴ ............................... H01M 6/14
[52] U.S. Cl. ........................ 429/194; 429/198; 429/199; 429/213
[58] Field of Search ............. 429/194, 213, 198, 199

[56] References Cited

U.S. PATENT DOCUMENTS 4,321,114 3/1982 MacDiaimid et al. ......... 429/199 X
4,463,071 7/1984 Gifford et al. ............... 429/194
4,463,072 7/1984 Gifford et al. ............... 429/19 X Primary Examiner—Charles F. LeFevour
Attorney, Agent, or Firm—Sughrue, Mion, Zinn Macpeak & Seas

[57] ABSTRACT

A battery having electrodes, at least one of which is made of a polymeric compound having conjugated double bonds in the main chain, is described. The organic solvent of an electrolytic solution in the battery is selected from nitrile compounds of the formulae (I) and (II):

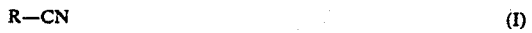

wherein R is a C2-7 alkyl, a saturated alicyclic C3-7 hydrocarbon residue, $CH_3-(CH_2)_x-O-(CH_2)_y$ or $NC-(CH_2)_z$ (x, y and z are 0 or a positive integer of up to 5), and

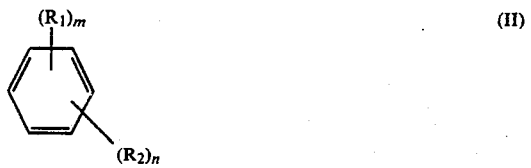

wherein $R_1$ is $-(CH_2)_p-CN$, $-O-(CH_2)_q-CN$ or

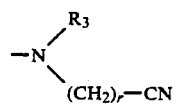

in which $R_3$ is a C1-5 alkyl and p, q and r are 0 or a positive integer of up to 5, $R_2$ is C1-5 alkyl, C1-5 alkoxy or $-(CH_2)_l-CN$ in which l is 0 or a positive integer of up to 3, and m is a positive integer of up to 3, and n is 0 or a positive integer of up to 3.

17 Claims, 6 Drawing Figures

BATTERY HAVING ELECTRODE MADE OF POLYMERIC COMPOUND HAVING CONJUGATED DOUBLE BONDS

BACKGROUND OF THE INVENTION (1) Field of the Invention

The present invention relates to a battery having a high performance, which comprises a polymeric compound having conjugated double bonds in the main chain as at least one electrode, wherein a specific nitrile compound is used as the solvent in an electrolytic solution.

(2) Description of the Prior Art

It is known that an acetylene high polymer prepared by polymerizing acetylene by using a so-called Ziegler-Natta catalyst comprising a transition metal compound and an organometallic compound exhibits an electrical conductivity falling within the semiconductor region and is therefore useful as an electrical or electronic element material. As means for preparing practical shaped articles of acetylene high polymers, there are known the following methods.

(A) A method in which a powdery acetylene high polymer is compression-molded.

(B) A method in which under specific polymerization conditions, polymerization is carried out to prepare a film of an acetylene high polymer having a fibrous microcrystalline (fibril) structure and having a high mechanical strength (see Japanese Examined Patent Publication No. 32,581/73).

It also is known that when a shaped article of the powdery acetylene high polymer prepared according to the method (A) is chemically treated with an electron-accepting compound (electron acceptor) such as $BF_3$, $BCl_3$, $HCl$, $Cl_2$, $SO_2$, $NO_2$, $HCN$, $O_2$ or $NO$, the electrical conductivity is increased about 1,000 times at the highest, and in contrast, when the shaped article is treated with an electron-donating compound (electron donor) such as ammonia or methylamine, the electrical conductivity is reduced to about 1/10,000 in an extreme case [D. J. Berets et al., Trans. Farady Soc., 64, 823 (1968)].

Furthermore, it is known that when the filmy acetylene high polymer prepared according to the method (B) is chemically doped with an electron-accepting compound such as $I_2$, $Cl_2$, $Br_2$, $ICl$, $IBr$, $AsF_5$, $SbF_5$ or $PF_6$ or an electron-donating compound such as Na, K or Li, the electrical conductivity of the acetylene high polymer can freely be controlled within a broad range of from $10^{-8}$ to $10^{+3}$ $\Omega^{-1}\cdot cm^{-1}$ [J.C.S. Chem. Commu., 578 (1977), Phys. Rev. Lett., 39, 1098 (1977), J. Am. Chem. Soc., 100, 1013 (1978) and J. Chem. Phys., 69, 5098 (1978)]. It has already been proposed that this doped filmy acetylene high polymer is used as a material of a positive electrode of a primary battery [Molecular Metals, NATO Conference Series, Series VI, 471–489 (1978)].

In addition to the above-mentioned chemical doping method, there has already been developed a method in which a p-type or n-type electrically conductive acetylene high polymer is prepared by electrochemically doping an acetylene high polymer with an anion such as $ClO_4^-$, $PF_6^-$, $AsF_6^-$, $AsF_4^-$, $CF_3SO_3^-$ or $BF_4^-$ or a cation such as $R'_4N^+$ (in which R' stands for an alkyl group) [J.C.S. Chem. Commu., 1979, 594, C & EN, Jan. 26, 39 (1981) and J.C.S. Chem. Commu., 1981, 317]. A rechargeable battery comprising an acetylene high polymer film prepared according to the method (B), which is electrochemically doped, has been reported [Paper Presented at the International Conference on Low Dimensional Synthetic Metals, Hersinger, Denmark, 10–15, August 1980]. This battery comprises as positive and negative electrodes two acetylene high polymer films having a thickness of, for example, 0.1 mm, which are obtained according to the method (B). When this battery is immersed in a tetrahydrofuran solution containing lithium iodide and is connected to a 9-V direct current power source, lithium iodide is electrolyzed, and the acetylene high polymer film as the positive electrode is doped with iodine and the acetylene high polymer film as the negative electrode is doped with lithium. This electrolytic doping corresponds to the charging step. If a load is connected to the two doped electrodes, the lithium ion is reacted with the iodine ion and an electric power can be taken out. In this case, the open circuit voltage (Voc) is 2.8 V and the short circuit current density is 5 mA/$cm^2$. When a tetrahydrofuran solution containing lithium perchlorate is used as the electrolyte, the open circuit voltage is 2.5 V and the short circuit current density is about 3 mA/$cm^2$.

Since the above-mentioned battery is formed by using as the electrode material an acetylene high polymer which is capable of providing a light-weight and small-size battery, this battery has attracted attentions as a cheap battery having a high density, the weight and size of which can easily be diminished. However, propylene carbonate, tetrahydrofuran or acetonitrile used as the organic solvent of the electrolytic solution in the conventional techniques disclosed in the above-mentioned prior art references has a relatively narrow range of the stable voltage, and therefore, decomposition or polymerization is readily caused at the step of charging or discharging the battery, resulting in reduction of the energy density, the charging-discharging efficiency, the discharge voltage levelness and the charging and discharging cycle number. Furthermore, the self-discharge rate of the battery is increased. Accordingly, development of a cheap battery comprising an organic solvent having a broad range of the stable voltage, the weight and size of which can be diminished, has been eagerly desired in the art.

SUMMARY OF THE INVENTION

It is a primary object of the present invention to provide a cheap battery having a high energy density, a high charging-discharging efficiency, a long cycle life, a good voltage levelness and a low self-discharging rate, the weight and size of which can easily be diminished.

More specifically, in accordance with the present invention, there is provided a battery comprising as at least one electrode a polymeric compound having conjugated double bonds in the main chain, wherein the organic solvent in an electrolytic solution is at least one member selected from nitrile compounds represented by the following general formulae (I) and (II):

R—CN  (I)

wherein R stands for an alkyl group having 2 to 7 carbon atoms, a saturated alicyclic hydrocarbon residue having 3 to 7 carbon atoms or a group $CH_3-(CH_2)_x-O-(CH_2)_y-$ or $NC-(CH_2)_z-$ in which x, y and z stand for 0 or a positive integer of up to 5, and

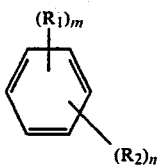

wherein $R_1$ stands for a group $-(CH_2)_p-CN$, $-O-(CH_2)_q-CN$ or

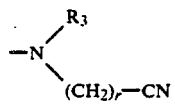

in which $R_3$ stands for an alkyl group having up to 5 carbon atoms and p, q and r stand for 0 or a positive integer of up to 5, $R_2$ stands for an alkyl or alkoxy group having up to 5 carbon atoms or a group $-(CH_2)_l-CN$ (in which l stands for 0 or a positive integer of up to 3), m is a positive integer of up to 3, and n is 0 or a positive integer of up to 3.

DETAILED DESCRIPTION OF THE PREFERRED EMBODIMENTS

Figure 1:
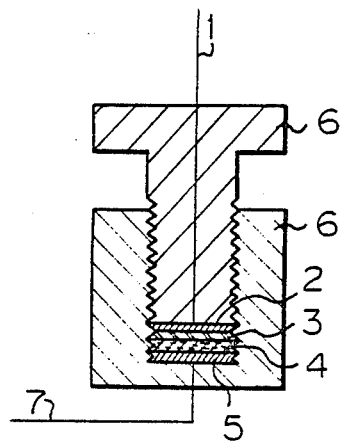
FIG. 1 is a sectional diagram illustrating an electrolytic cell for measuring the characteristics of a secondary battery according to one embodiment of the present invention.

The battery of the present invention comprising a nitrile compound as the organic solvent in the electrolytic solution is advantageous over a known battery comprising propylene carbonate, tetrahydrofuran or acetonitrile in various points. For example, in case of a primary battery, (i) the discharge capacity is large, (ii) the voltage levelness is good, and (iii) the self-discharge rate is reduced. In case of a secondary battery, (i) the energy density is high, (ii) the voltage levelness is good, (iii) the self-discharge rate is reduced, and (iv) the recycle life is long.

Among known organic solvents, acetonitrile has a high polarity and dissolves many electrolytes very well, and an electrolytic solution comprising acetonitrile as the solvent has a high electrical conductivity. Accordingly, acetonitrile is an excellent solvent for an electrolytic solution. However, the electrolytic solution comprising acetonitrile has a relatively narrow range of the stable voltage, and in case of a battery having an electrode of a polymeric compound having conjugated double bonds in the main chain (acetylene high polymer), decomposition and polymerization are caused at the charging step and in case of a secondary battery, the cycle characteristic is reduced. On the other hand, if the above-mentioned nitrile compound of the present invention is used, to our great surprise, there is provided a secondary battery excellent in the cycle characteristic.

If the specific aliphatic nitrile compound (I) is used as the organic solvent in the electrolytic solution according to the present invention, there can be attained prominent effects. Although the functional mechanism has not been completely elucidated, it is believed that these prominent effects will be attained for the following reasons. The specific aliphatic nitrile compound (I) used in the present invention has a lower polarity than acetonitrile, but it dissolves various supporting electrolytes and the stable voltage range is relatively broad. Accordingly, even in case of a secondary battery comprising an electrode of a polymeric compound having conjugated double bonds in the main chain, at the cycle test such decomposition or polymerization as caused when acetonitrile is used is not caused at all. Degradation of the polymeric compound having conjugated double bonds in the main chain at the charging step is much lower than when acetonitrile is used as the solvent. For these reasons, the cycle characteristic of the secondary battery will be improved.

As specific examples of the polymeric compound having conjugated double bonds in the main chain, used in the present invention, there can be mentioned an acetylene high polymer, poly-p-phenylene, poly-m-phenylene, poly(2,5-thienylene), poly(3-methyl-2,5-thienylene), polypyrrole, polyimide, poly(N-methylpyrrole), polyphenylacetylene, polyacene, a polyquinoline such as polyphenylquinoline, a polyacene-quinone radical polymer, a quinazone polymer having a Schiff base structure, a polyarylene-quinone and a thermal decomposition product of polyacrylonitrile or polyimide. Of course, polymeric compounds that can be used in the present invention are not limited to those exemplified above. Namely, any of polymeric compounds having conjugated double bonds in the main chain can be used in the present invention. Furthermore, either homopolymers or copolymers may be used. Among the above-mentioned polymeric compounds, an acetylene high polymer, poly-p-phenylene, poly(2,5-thienylene), poly(3-methyl-2,5-thienylene) and polypyrrole are preferred. An acetylene high polymer is most preferred.

The process for the preparation of the acetylene high polymer preferably used in the present invention is not particularly critical, and any of known processes may be adopted. For example, there may be adopted processes disclosed in Japanese Examined Patent Publications Nos. 32,581/73 and 45,365/81, Japanese Unexamined Patent Publications Nos. 129,404/80, 128,419/80, 142,012/80, 10,428/81 and 133,133/81, Trans. Farady So., 64, 823 (1968), J. Polymer Sci., A-1, 7, 3419 (1969), Makromol. Chem., Rapid Comm., 1, 621 (1980), J. Chem. Phys., 69(1), 106 (1978), and Synthetic Metals, 4, 81 (1981).

An electrically conductive material such as graphite, carbon black, acetylene black, metal powder or carbon fiber may be incorporated in the polymeric compound having conjugated double bonds in the main chain in the present invention, and a metal net or the like may be incorporated as a current collector.

It is preferred that an acetylene high polymer, especially a linear acetylene high polymer of the conjugated chain type be integrated with a sheet-form product of a fibrous material. Any of powdery, fibrous, filmy and swollen (gel-like) polymers can be used, but a highly crystalline polymer having a fibrous microcrystalline (fibril) structure or a lamellar structure is preferred. Highly crystalline acetylene high polymers having a fibrous microcrystalline (fibril) structure or a lamellar structure can be prepared according to methods disclosed in, for example, Makromol. Chem., Rapid Comm., 1, 621 (1980), J. Chem. Phys., 69 (1), 106 (1978), Japanese Unexamined Patent Publications Nos. 128,419/80, 129,404/80, 142,030/80, 145,710/80, 145,711/80 and 10,428/81 and Japanese patent application No. 34,687/80.

The "swollen or gel-like acetylene high polymer" used herein means an acetylene high polymer having a fibrous microcrystalline (fibril) structure, which is in the state of being entangled with each other in an organic solvent and thus is swollen with the solvent. This swollen or gel-like polymer is different from a so-called "gel".

Preferable acetylene high polymers are of a powdery form, a short fibrous form, or a swollen or gel-like form. Particularly, a powdery acetylene high polymer having an average particle size smaller than 0.5 cm, especially smaller than 0.2 cm, or a short fibrous acetylene high polymer having a length of smaller than 5 cm, especially smaller than 2 cm, is more preferable. These acetylene high polymers can be prepared according to the method of Natta et al. [Atti. Acad. Nazl. Linoi Rend. Calsse Sci. Fis. Mat. Nat 25, 3 (1958)], the method of Hatano et al. [J. Polym. Sci. 51, 526 (1961)], the method of Tsuchida et al. [J. Polym. Sc. A2, 3347 (1964)], the method of Pez (U.S. Pat. No. 4,228,060) and the method proposed by some of the inventors of the present invention (Japanese Unexamined Patent Publications Nos. 129,404/80 and 145,710/80). Applicable methods are not limited to the methods mentioned above. Moreover, there is advantageously adopted a method in which a swollen acetylene high polymer film prepared according to the method proposed by some of the inventors of the present invention in Japanese Unexamined Patent Publication No. 115,305/81 is pulverized into a short fiber having a length smaller than 1 cm. In the case where a powdery acetylene high polymer is used, shaping is easier than when a filmy acetylene high polymer is used, and the quality of a shaped article is uniform and good.

The acetylene high polymer used in the present invention may be either amorphous or crystalline, and have an optional cis-trans composition. A crystalline acetylene high polymer having a crystalline degree of at least 60% is preferable.

It is preferable that the acetylene high polymer combined with the sheet-form product of a fibrous material be subjected to press molding or calender molding. This molding may be carried out in the presence or absence of an organic solvent. However, it is preferred that the molding be carried out in the presence of an organic solvent, because a reinforced acetylene high polymer having a higher mechanical strength is obtained. Any of organic solvents unreactive with the acetylene high polymer can be used without any limitation. Ordinarily, aliphatic hydrocarbons, aromatic hydrocarbons, halogenated hydrocarbons, ethers, esters, lactones and alcohols are used. An organic solvent used for polymerization or removal of the catalyst can be used.

In the present invention, the polymeric compound having conjugated double bonds in the main chain may be used as the electrode in the as-prepared state or in the form of an electrically conductive polymeric compound obtained by doping the polymeric compound with a dopant. In the case where the battery of the present invention is a primary battery, it is preferred that the polymeric compound be used in the form of an electrically conductive polymeric compound.

Either chemical doping or electrochemical doping may be adopted for doping the polymeric compound having conjugated double bonds in the main chain (hereinafter referred to as "conjugated polymeric compound") with a dopant.

Various known electron-accepting and electron-donating compounds may be used as the dopant to be chemically doped in the conjugated polymeric compound in the present invention. For example, there can be mentioned (i) halogens such as iodine, bromine and bromine iodide, (ii) metal halides such as arsenic pentafluoride, antimony pentafluoride, silicon tetrafluoride, phosphorus pentachloride, phosphorus pentafluoride, aluminum chloride, aluminum bromide and aluminum fluoride, (iii) protonic acids such as sulfuric acid, nitric acid, fluorosulfuric acid, trifluoromethane sulfuric acid and chlorosulfuric acid, (iv) oxidants such as sulfur trioxide, nitrogen dioxide and difluorosulfonyl peroxide, (v) $AgClO_4$, and (vi) tetracyanoethylene, tetracyanoquinodimethane, chloranil, 2,3-dichloro-5,6-dicyano-p-benzoquinone and 2,3-dibromo-5,6-dicyano-p-benzoquinone.

As the dopant used for electrochemically doping the conjugated polymeric compound, there can be mentioned (i) anion dopants, for example, anions of halides of elements of the group Va such as $PF_6^-$, $SbF_6^-$, $AsF_6^-$, and $SbCl_6^-$, anions of halides of elements of the group IIIa such as $BF_4^-$, halogen anions such as $I^-$ ($I_3^-$), $Br^-$ and $Cl^-$, and perchloric acid anions such as $ClO_4^-$ (each of these anions is effective as a dopant for providing a p-type electrically conductive conjugated polymeric compound), and (ii) cation dopants, for example, alkali metal ions such as $Li^+$, $Na^+$ and $K^+$, and quaternary ammonium ions such as $R_4N^+$ (in which R stands for a hydrocarbon group having 1 to 20 carbon atoms) (each of these cations is effective as a dopant for providing an n-type electrically conductive conjugated polymeric compound). Of course, dopants that can be used in the present invention are not limited to those exemplified above.

Specific examples of compounds providing the above-mentioned anion and cation dopants include $LiPF_6$, $LiSbF_6$, $LiAsF_6$, $LiClO_4$, $NaI$, $NaPF_6$, $NaSbF_6$, $NaAsF_6$, $NaClO_4$, $KI$, $KPF_6$, $KSbF_6$, $KAsF_6$, $KClO_4$, $[(n-Bu)_4]^+ \cdot (AsF_6)^-$, $[(n-Bu)_4]^+ \cdot (PF_6)^-$, $[(n-Bu)_4N]^+ \cdot ClO_4^-$, $LiAlCl_4$ and $LiBF_4$. Of course, compounds that can be used are not limited to those exemplified above. These dopants may be used alone or in combination.

As the anion dopant other than those mentioned above, there can be mentioned an $HF_2^-$ anion, and as the cation dopant other than those mentioned above, there can be mentioned pyrylium and pyridinium cations represented by the following formula (III):

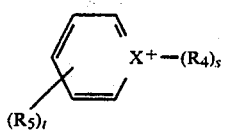 (III)

wherein X stands for an oxygen atom or nitrogen atom, R$_4$ stands for a hydrogen atom, an alkyl group having 1 to 15 carbon atoms or an aryl group having 6 to 15 carbon atoms, R$_5$ stands for a halogen atom, an alkyl group having 1 to 10 carbon atoms or an aryl group having 6 to 15 carbon atoms, s is 0 when X is an oxygen atom or s is 1 when X is a nitrogen atom, and t is 0 or a number of from 1 to 5, and carbonium cations represented by the following formulae (IV) and (V):

 (IV)

wherein R$^6$, R$^7$ and R$^8$ stand for a hydrogen atom, an alkyl group having 1 to 15 carbon atoms, an allyl group, an aryl group having 6 to 15 carbon atoms or a group —OR$^{10}$ in which R$^{10}$ stands for an alkyl group having 1 to 10 carbon atoms or an aryl group having 6 to 15 carbon atoms, with the proviso that the case where all of R$^6$, R$^7$ and R$^8$ are hydrogen atoms is excluded, and

 (V)

wherein R$^9$ stands for a hydrogen atom, an alkyl group having 1 to 15 carbon atoms or an aryl group having 6 to 15 carbon atoms.

The above-mentioned HF$_2^-$ anion, pyrylium and pyridinium cations represented by the formula (III) and carbonium cations represented by the formula (IV) and (V) can be doped in large quantities in the conjugated polymeric compound and therefore, batteries having a large discharge capacitance and a high energy density can be provided.

The HF$_2^-$ anion is ordinarily obtained by using as a supporting electrolyte a compound (hydrofluoride) represented by the following formula (VI), (VII) or (VIII):

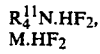

(VI)
(VII)

or

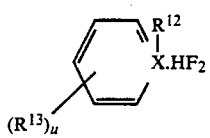 (VIII)

wherein R$^{11}$ and R$^{12}$ stand for a hydrogen atom, an alkyl group having 1 to 15 carbon atoms or an aryl group having 6 to 15 carbon atoms, R$^{13}$ stands for an alkyl group having 1 to 10 carbon atoms or an aryl group having 6 to 15 carbon atoms, X stands for an oxygen atom or nitrogen atom, u is 0 or a positive integer of up to 5, and M stands for an alkali metal, and dissolving said compound in an appropriate organic solvent. As the compounds represented by the above formulae (VI), (VII) and (VIII), there can be mentioned H$_4$N.HF$_2$, (n-Bu)$_4$N.HF$_2$, Na.HF$_2$, K.HF$_2$, Li.HF$_2$ and

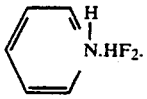

The pyrylium or pyridinium cation represented by the formula (III) is obtained by using as a supporting electrolyte a salt of the cation represented by the formula (III) with an anion such as ClO$_4^-$, BF$_4^-$, AlCl$_4^-$, FeCl$_4^-$, SnCl$_5^-$, PF$_6^-$, PCl$_6^-$, SbF$_6^-$, AsF$_6^-$, CF$_3$SO$_3^-$ or HF$_2^-$ and dissolving the salt in an appropriate organic solvent. As specific examples of the salt, there can be mentioned the following compounds:

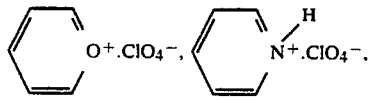

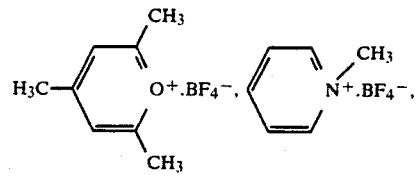

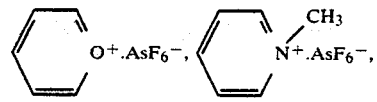

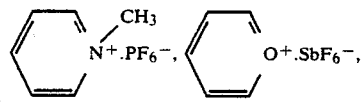

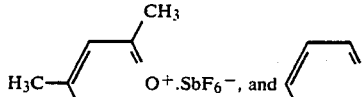

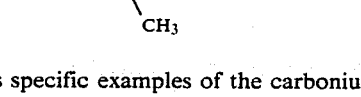

As specific examples of the carbonium cation represented by the formula (IV) or (V), there can be mentioned (C$_6$H$_5$)$_3$C$^+$, (CH$_3$)$_3$C$^+$,

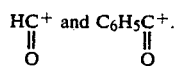

The carbonium cation represented by the formula (IV) or (V) is ordinarily obtained by using as a supporting electrolyte a salt (carbonium salt) of the carbonium cation with an anion and dissolving the salt in an appropriate organic solvent. As typical instances of the anion, there can be mentioned BF$_4^-$, AlCl$_4^-$, AlBr$_3$Cl$^-$, FeCl$_4^-$, SnCl$_3^-$, PF$_6^-$, PCl$_6^-$, SbCl$_6^-$, SbF$_6^-$, ClO$_4^-$ and CF$_3$SO$_3^-$. As specific examples of the carbonium salt, there can be mentioned (C$_6$H$_5$)$_3$C.BF$_4$, $(CH_3)_3C.BF_4$, $HCO.AlCl_4$, $HCO.BF_4$ and $C_6H_5CO.SnCl_5$.

The amount of the dopant doped into the conjugated polymeric compound is 2 to 40 mole %, preferably 4 to 30 mole %, more preferably 5 to 20 mole %, based on the recurring units of the conjugated polymeric compound. If the amount of the dopant doped in the conjugated polymeric compound is smaller than 2 mole % or larger than 40 mole %, a battery having a sufficiently large discharge capacitance cannot be obtained.

The electrical conductivity of the conjugated polymeric compound in the non-doped state is $10^{-10}$ to $10^{-5} \Omega^{-1}.cm^{-1}$, and the electrical conductivity of the doped conjugated polymeric compound is about $10^{-10}$ to about $10^4 \Omega^{-1}.cm^{-1}$. When the doped conjugated polymeric compound is used as an electrode of a primary battery, it is preferred that the electrical conductivity be higher than about $10^{-4} \Omega^{-1}.cm^{-1}$, and when the doped conjugated polymeric compound is used as an electrode of a secondary battery, it is preferred that the electrical conductivity be about $10^{-10}$ to about $10^{-4} \Omega^{-1}.cm^{-1}$ or higher than about $10^{-4} \Omega^{-1}.cm^{-1}$.

The doping amount can freely be controlled by measuring the quantity of electricity flowing during the electrolysis. Doping may be carried out under a constant current or constant voltage condition or under a varying current or varying voltage condition. The doping current, voltage and time vary depending on the kind, bulk density and area of the conjugated polymeric compound, the kind of the dopant, the kind of the electrolytic solution and the required electrical conductivity.

As the aliphatic nitrile compound of the general formula (I) used as the organic solvent in the present invention, these where R of the general formula (I) is an alkyl group having 2 to 7 carbon atoms, especially 3 to 5 carbon atoms, or a saturated alicyclic hydrocarbon residue having 3 to 7 carbon atoms are preferred.

As specific examples of the aliphatic nitrile compound represented by the general formula (I), there can be mentioned propionitrile, cyclopropyl cyanide, butyronitrile, valeronitrile, cyclohexane carbonitrile, 4-methylvaleronitrile, octane nitrile, adiponitrile, 3-methoxypropionitrile, 3-ethoxypropionitrile, succinonitrile and isobutyronitrile. Of course, aliphatic nitriles that can be used in the present invention are not limited to those exemplified above. Among these aliphatic nitriles, valeronitrile, cyclohexane carbonitrile, 4-methylvaleronitrile and butyronitrile are preferred, and valeronitrile is especially preferred.

As specific examples of the aromatic nitrile of the general formula (II) used as the organic solvent in the present invention, there can be mentioned benzonitrile, phthalodinitrile, o-tolunitrile, p-tolunitrile, m-tolunitrile, p-methoxyphenylacetonitrile, o-methoxyphenylacetonitrile, m-methoxyphenylacetonitrile, 3,4-dimethoxybenzoacetonitrile, N-(2-cyanoethyl)-N-methylaniline, N-ethyl-N-(2-cyanoethyl)aniline, N-ethyl-N-(2-cyanoethyl)-m-toluidine, N-n-butyl-N-(2-cyanoethyl)aniline and 3-phenoxypropionitrile. Aromatic nitriles that can be used in the present invention are not limited to those exemplified above. Among these aromatic nitriles, benzonitrile, phthalodinitrile, o-, m- and p-tolylnitriles and o-, m- and p-methoxyphenylacetonitriles are preferred. Benzonitrile and o-, m- and p-tolunitriles are especially preferred.

In general, the aromatic nitrile compounds are preferred as compared with the aliphatic nitrile compounds.

The foregoing aliphatic nitrile compounds (I) and aromatic nitrile compound (II) may be used alone or in the form of mixed solvents of two or more of them. Moreover, these nitrile compounds may be used in the form of mixed solvents with other non-protonic organic solvents. It is preferred that the amount of the non-protonic solvent used be smaller than the amount of the nitrile compound based on the weight.

As the non-protonic organic solvent used in the present invention, there can be mentioned, for example, ethers, ketones, amines, amides, nitriles other than those which are represented by the formulae (I) and (II), sulfur compounds, chlorinated hydrocarbons, esters, carbonates, nitro compounds, phosphoric acid ester compounds and sulfolane compounds. Of these, ethers, ketones, nitriles other than those of the formulae (I) and (II), chlorinated hydrocarbons, carbonates and sulfolane compounds are preferred. As typical examples, there can be mentioned acetonitrile, tetrahydrofuran, 2-methyltetrahydrofuran, 1,4-dioxane, anisole, monogrime, 4-methyl-2-pentanone, 1,2-dichloroethane, γ-butyrolactone, dimethoxyethane, methyl formate, propylene carbonate, ethylene carbonate, dimethylformamide, dimethylsulfoxide, dimethylthioformamide, sulfolane, 3-methylsulfolane, trimethyl phosphate and triethyl phosphate. Non-protonic solvents that can be used are not limited to those exemplified above.

When the conjugated polymeric compound in the non-doped state or the electroconductive conjugated polymeric compound obtained by doping the conjugated polymeric compound with a dopant such as mentioned above is used as at least one electrode of a battery, as the supporting electrolyte of the electrolytic solution of the battery, there may be used those mentioned above with respect to electrochemical doping, and doping may be carried out under conditions as described hereinbefore.

The concentration of the electrolyte used in the battery of the present invention varies depending on the kind of the positive or negative electrode used, the charging and discharging conditions, the operating temperature, the kind of the electrolyte and the kind of the organic solvent and is not generally defined, but it is ordinarily preferred that the concentration of the electrolyte be 0.001 to 10 moles per liter.

In the present invention, the conjugated polymeric compound or the electroconductive conjugated polymeric compound obtained by doping the conjugated polymeric compound with a dopant can be used as the active material of (i) a positive electrode, (ii) a negative electrode or (iii) positive and negative electrodes. In order to attain the effects of the present invention most efficiently, it is preferred that batteries of the type (ii) and (iii) be used. A battery of the type (iii) is optimum.

It is preferred that the battery comprising the nitrile compound (I) or (II) as the solvent of the electrolytic solution be used as a secondary battery. In case of a secondary battery where an acetylene high polymer is used as the conjugated polymeric compound, as examples of the secondary battery of the type (i), there can be mentioned $(CH)_x$(positive electrode)/$LiClO_4$ (electrolyte)/Li(negative electrode) and $[(CH)^{+0.06}(ClO_4)^{-}_{0.06}]_x$(positive electrode)/$LiClO_4$(electrolyte)/Li (negative electrode), as an example of the battery of the type (ii), there can be mentioned graphite(positive electrode)/(n-Bu$_4$N)$^+$.(ClO$_4$)$^-$(electrolyte)/(CH)$_x$(negative electrode) and TiS$_2$(positive electrode)/LiClO$_4$(electrolyte)/(CH)$_x$(negative electrode), and as examples of the battery of the type (iii), there can be mentioned [(CH)$^{+0.024}$(ClO$_4$)$_{-0.024}$]$_x$(positive electrode)/(n-Bu$_4$N)$^+$.(ClO$_4$)$^-$(electrolyte/[(n-Bu$_4$N)$^{+0.024}$(CH)$_{-0.024}$]$_x$(negative electrode), [CH$^{+0.06}$(PF$_6$)$_{-0.06}$]$_x$(positive electrode)/(n-Bu$_4$N)$^+$.(PF$_6$)$^-$(electrolyte)/[(n-Bu$_4$N)$^{+0.06}$(CH)$_{-0.06}$]$_x$(negative electrode), [(CH)$^{+0.050}$(ClO$_4$)$_{-0.050}$]$_x$(positive electrode)/(n-Bu$_4$N)$^+$.(ClO$_4$)$^-$(electrolyte)/](CH)$^{+0.20}$(ClO$_4$)$_{-0.020}$]$_x$(negative electrode), [(n-Bu$_4$N)$^{+0.20}$(CH)$_{-0.02}$]$_x$(positive electrode)/(n-Bu$_4$N)$^+$.(ClO$_4$)$^-$(electrolyte)/[(n-Bu$_4$N)$^{+0.07}$(CH)$_{-0.07}$]$^x$(positive electrode) and [(CH)$^{+0.010}$(I$_3$)$_{-0.010}$]$_x$(positive electrode)/NaI (electrolyte)/[(CH)$_{-0.010}$(Na)$^{+0.010}$]$_x$(negative electrode), in which (CH)$_x$ stands for an acetylene high polymer.

When poly-p-phenylene, poly(2,5-thienylene), poly(3-methyl-2,5-thienylene), polypyrrole poly(N-methyl-pyrrole) or polyphenylquinoline is used, there can be used secondary batteries of the above-mentioned structures where (C$_6$H$_4$)$_x$, (C$_4$H$_2$S)$_x$, (C$_5$H$_4$S)$_x$, (C$_4$H$_3$N)$_x$, (C$_5$H$_5$N)$_x$ or (C$_{15}$H$_9$N)$_x$ is substituted for (CH)$_x$.

In the present invention, different conjugated polymeric compounds may be used for the positive and negative electrodes. For example, there can be mentioned (CH)$_x$/LiClO$_4$/(C$_6$H$_4$)$_x$, (CH)$_x$/LiClO$_4$/(C$_4$H$_2$S)$_x$, (C$_6$H$_4$)$_x$/LiClO$_4$/(C$_4$H$_2$S)$_x$, (C$_4$H$_2$S)$_x$/Bu$_4$NBF$_4$/(CH)$_x$, (C$_4$H$_3$N)$_x$/Bu$_4$NBF$_4$/(CH)$_x$ and (CH)$_x$/Bu$_4$NBF$_4$/(C$_{15}$H$_9$N)$_x$.

As hereinbefore mentioned, batteries of the type wherein the conjugated polymeric compound or the electroconductive conjugated polymeric compound obtained by doping the conjugated polymeric compound with a dopant is used as the active material of both positive and negative electrodes are preferable. Such batteries include, for example, (CH)$_x$(positive electrode)/(CH)$_x$(negative electrode), (C$_4$H$_2$S)$_x$(positive electrode)/(CH)$_x$(negative electrode), (C$_4$H$_2$N)$_x$(positive electrode)/(CH)$_x$(negative electrode) and (CH)$_x$(positive electrode)/(C$_{15}$H$_9$N)$_x$ (negative electrode). Of these, (CH)$_x$(positive electrode)/(CH)$_x$(negative electrode) and (C$_4$H$_3$N)$_x$, (C$_4$H$_2$S)$_x$ or (C$_5$H$_4$S)$_x$(positive electrode)/(CH)$_x$(negative electrode) are especially preferable. In the latter battery, the (C$_4$H$_3$N)$_x$, (C$_4$H$_2$S)$_x$ or (C$_5$H$_4$S)$_x$ positive electrode may be substituted by a composite positive electrode made of (CH)$_x$ coated with (C$_4$H$_3$N)$_x$, (C$_4$H$_2$S)$_x$ or (C$_5$H$_4$S)$_x$.

As a most preferred battery of the present invention, there can be mentioned a battery in which an acetylene high polymer or an electroconductive acetylene high polymer obtained by doping an acetylene high polymer with a dopant is used for at least one electrode and valeronitrile, benzonitrile or m-tolunitrile is used as the organic solvent of the electrolytic solution.

As an example of the primary battery, there can be mentioned a battery in which an electroconductive conjugated polymeric compound is used as the positive electrode active material and a metal having a Pauling electronegativity value not exceeding 1.6 is used as the negative electrode active material. As examples of the metal to be used as the negative electrode active material, there can be mentioned alkali metals such as lithium and sodium, and aluminum and magnesium. Lithium and aluminum are preferred. These metals may be used in the form of a sheet as in an ordinary lithium battery, or this sheet may be press-bonded to a nickel or stainless steel net.

If necessary, a separator is used in the battery of the present invention. The separator is made of, for example, a polypropylene nonwoven fabric, a glass mat, a polypropylene mat, porous polyethylene, glass filter paper or asbestos filter paper. Of these, a polypropylene nonwoven fabric and glass filter paper are preferable.

A part of the conjugated polymeric compound used in the present invention is gradually oxidized by oxygen and the capacities of the battery are reduced. Accordingly, it is necessary that the battery be closed to produce a substantially oxygen-free state. Thus, the battery is of a structure such that it has the body of the battery is placed within a closed metal can or plastic case.

The battery of the present invention may comprise at least one pair of a positive electrode and a negative electrode, one or both of which are made of a polymeric compound having conjugated double bonds in the main chain, and at least one separator placed between each pair of the electrodes. If necessary, at least one electrolytic solution-adsorbing material such as felt may be provided in the separator. The electrodes, the separator and the electrolytic solution-adsorbing material are impregnated with a solution of an electrolyte in the organic solvent which is a nitrile compound of the aforesaid formula (I) or (II).

The battery of the present invention may be either of a single layer cell structure or a multi-layer cell structure. The battery of the multi-layer cell structure exhibits a voltage which is the product of an electromotive force of each layer with the number of layers.

In the battery of the present invention, an electrode collector may be used, which is made of a metal such as stainless steel, nickel, copper or aluminum, or graphite or an electroconductive paste.

Figure 4:
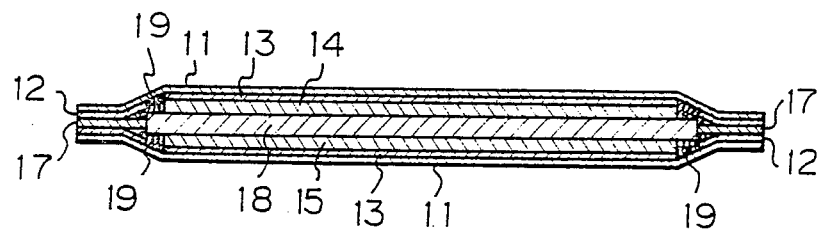
FIG. 4 is a sectional view showing an example of the battery of the present invention which has a single layer cell structure.
Figure 5:
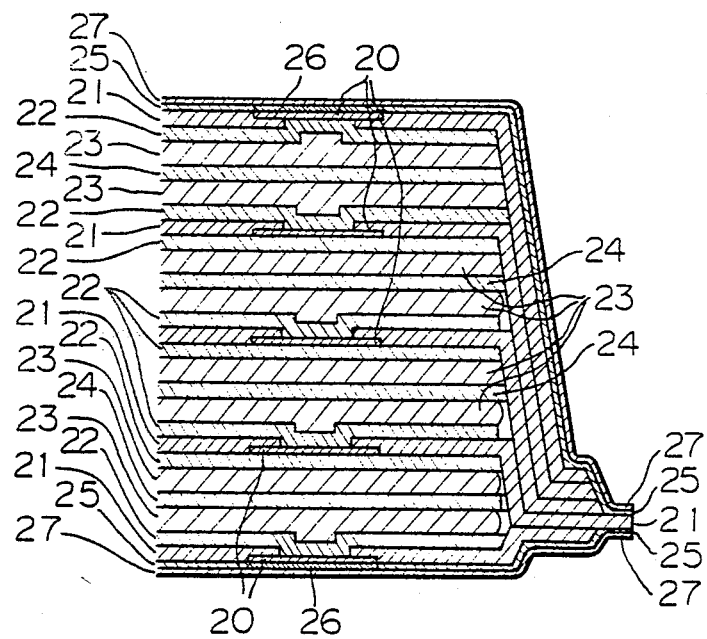
FIG. 5 is a sectional view showing an example of the battery of the present invention, which has a multi-layer cell structure.
Figure 6:
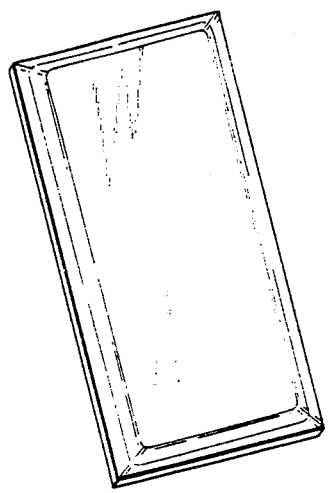
FIG. 6 is a schematic view of the battery shown in FIG. 5.

An example of the battery having a single layer cell structure is shown in FIG. 4, and an example of the battery having a multi-layer cell structure is shown in FIG. 5 and FIG. 6.

Referring to FIG. 4, the battery comprises a positive electrode 14 and a negative electrode 15, both of which are made of polyacetylene, and a separator 18 sandwiched between the two electrodes and made of a glass fiber mat. These electrodes 14, 15, separator 18, and polyethylene binder layers 12, expanded metal sheets 13, insulators 17 and a liquid-retaining material (such as glass fiber) 19 are encased in a case 11 made of a stainless steel sheet.

Referring to FIG. 5, the battery having the multilayer cell structure comprises a case 27 made of an aluminum sheet, a polyethylene laminate 25 adhered onto the inner surface of the case 27, insulating sheets 21 made of a fluorine-containing resin sheet both surfaces of which have been coated with polyethylene, metal sheets 20 such as stainless steel sheets, electroconductive adhesive layers 26 such as a conductive epoxy resin, current collectors 22 made of stainless steel, electrodes 23 made of a polymeric compound having conjugated double bonds such as polyacetylene, and separators 24 made of polypropylene nonwoven fabric.

The battery of the present invention in which a specific nitrile compound is used as the organic solvent of the electrolytic solution and a conjugated polymeric compound or an electroconductive conjugated polymeric compound obtained by doping a conjugated polymeric compound with a dopant is used for at least one electrode has a high energy density, a high charging or discharging efficiency, a long cycle life, a low self-discharge rate and a good voltage levelness at the discharging step. Furthermore, the battery of the present invention has a light weight and a small size and has a high energy density. Accordingly, the battery of the present invention is suitably used for a portable appliance, an electric automobile or a gasoline car or as a power storage battery.

The present invention will now be described in detail with reference to the following examples and comparative examples.

EXAMPLE 1

[Preparation of Filmy Acetylene High Polymer]

In a nitrogen atmosphere, a glass reaction vessel having an inner capacity of 500 ml was charged with 1.7 ml of titanium tetrabutoxide. The titanium tetrabutoxide was dissolved in 30 ml of anisole and then 2.7 ml of triethyl aluminum was added with stirring to the solution to form a catalyst solution.

The reaction vessel was cooled by liquid nitrogen and nitrogen gas in the system was removed by a vacuum pump. Then, the reaction vessel was cooled to $-78°$ C. and refined acetylene gas maintained at a pressure of 1 atmosphere was blown into the reaction vessel while the catalyst solution was kept stationary.

Immediately, the polymerization took place on the surface of the catalyst solution and a filmy acetylene high polymer was formed. When 30 minutes had passed from the point of the start of introduction of the acetylene gas, the acetylene gas in the reaction vessel was removed to stop the polymerization. In a nitrogen atmosphere, the catalyst solution was removed by an injector, and the formed polymer was washed 5 times repeatedly with 100 ml of refined toluene while maintaining the temperature at $-78°$ C. The thus prepared filmy acetylene high polymer swollen with toluene was a uniform swollen film in which fibrils were densely entangled with one another. Then, the swollen film was vacuum-dried to obtain a filmy acetylene high polymer having a reddish violet color and a metallic gloss. This filmy acetylene high polymer had a thickness of 100 $\mu$m and an exhibited cis content of 98%, a bulk density of 0.30 g/cc and an electrical conductivity of $3.2 \times 10^{-9}$ $\Omega^{-1}.cm^{-1}$ as measured at 20° C. according to the direct current four-terminal method.

[Battery Test

Two test pieces having a width of 0.5 cm and a length of 2.0 cm were taken out from the filmy acetylene high polymer having a thickness of 100 $\mu$m and a bulk density of 0.30 g/cc. The test pieces were mechanically secured to different platinum wires to form positive and negative electrodes. A valeronitrile solution having a $(Bu_4N)^+.(BF_4)^-$ concentration of 1.0 mole/l was used as the electrolytic solution, and charging was carried out under a constant current (2.0 mA/cm$^2$) for 15 minutes (the amount of electricity corresponded to the doping quantity of 8 mole %). Immediately after the charging, the discharging was carried out under a constant current (2.0 mA/m$^2$), and when the voltage was reduced to 1 V, the charging was carried out again under the same conditions as described above. This charging-discharging cycle was repeated 200 times. The voltage characteristics at the 200th discharging was substantially the same as those at the second or third discharging.

The energy density was 160 w·hr/kg of the active material used, and the charging-discharging efficiency was 96%. The ratio of the quantity of electricity discharged until the voltage was reduced to 1.0 V at the discharging step, to the total quantity of electricity was 94%.

When the battery was allowed to stand in the charged state for 48 hours, the self-discharge rate was 5%.

The repetition frequency of charging-discharging conducted until the charging-discharging efficiency was reduced to 50% was 412 times.

COMPARATIVE EXAMPLE 1

[Battery Test]

The charging-discharging repetition test was carried out in the same manner as described in Example 1 except that tetrahydrofuran was used instead of valeronitrile as the organic solvent of the electrolytic solution. When charging-discharging was repeated 21 times, charging became impossible. When the filmy acetylene high polymer was taken out after the test, the film was broken. When a part of the film was subjected to the elementary analysis and infrared spectral analysis, it was found that the film was drastically deteriorated. The electrolytic solution was colored brown.

The energy density was 115 w·hr/kg of the active material, and the charging-discharging efficiency was 58%. The ratio of the amount of electricity discharged unitl the voltage was reduced to 1.0 V at the discharging step, to the total amount of electricity was 57%. When the battery was allowed to stand in the charged state for 48 hours, the self-discharge rate was 28%. The repetition frequency of charging-discharging conducted until the charging-discharging frequency was reduced to 50% was 87 times.

EXAMPLE 2

A 100-mesh net of stainless steel was placed in a 1-liter glass reaction vessel, the inside atmosphere of which was completely substituted by nitrogen gas, and 100 ml of toluene refined according to the conventional method was charged as the polymerization solvent. Then, 4.41 millimoles of tetrabutoxy titanium and 11.01 millimoles of triethyl aluminum were charged as the catalyst into the reaction vessel at room temperature to form a catalyst solution. The catalyst solution was homogeneous. Then, the reaction vessel was cooled by liquid nirogen, and nitrogen gas in the reaction vessel was removed by a vacuum pump. The reaction vessel was cooled to $-78°$ C. and refined acetylene gas maintained at a pressure of 1 atmosphere was blown into the reaction vessel while the catalyst solution was kept stationary. The polymerization was carried out for 10 hours while maintaining the pressure of the acetylene gas at 1 atmosphere. A gel-like product having a reddish violet color was obtained. After completion of the polymerization, the unreacted acetylene gas was removed, and the reaction product was washed 4 times repeatedly with 200 ml of refined toluene while maintaining the temperature at $-78°$ C. to obtain a stainless steel net-containing sheet-like swollen acetylene high polymer swollen with toluene and having a thickness of about 0.5 cm. In this swollen acetylene high polymer, fibrous fine crystals (fibrils) having a diameter of 300 to 500 angstroms were regularly entangled with each other, and no powdery or bulky polymer was found.

This stainless steel net-containing sheet-like swollen acetylene polymer was placed between chromium-deposited ferro type plates and preliminally pressed at room temperature under a pressure of 100 kg/cm². Then, the sheet-like polymer was pressed under a high pressure of 15 ton/cm² to obtain a uniform flexible composite product having a metallic gloss and a reddish brown color and having a thickness of 280 μm. The composite product was vacuum-dried at room temperature for 5 hours. This composite product contained 43% by weight of the stainless steel net.

[Battery Test]

Two discs having a diameter of 20 mm were cut out from the thus-obtained composite product and a battery was constructed by using these discs as the positive electrode and negative electrode active mateials.

FIG. 1 is a sectional diagram illustrating a battery cell for measuring the characteristics of a secondary battery according to one embodiment of the present invention. Reference numeral 1 represents a platinum lead wire for the negative electrode, reference numeral 2 represents a disc-shaped negative electrode having a diameter of 20 mm, reference numeral 3 represents a disc-shaped porous polypropylene membrane having a diameter of 20 mm, reference numeral 4 represents a circular felt for a carbon fiber having a diameter of 20 mm, reference numeral 5 represents a positive electrode, reference numeral 6 represents a Teflon vessel, and reference numeral 7 represents a platinum lead wire for the positive electrode.

The above-mentioned electrode was placed in the recess in the lower portion of the vessel 6, and the felt 4 was placed in the recess of the vessel 6 and piled on the positive electrode. The felt and positive electrode were impregnated with an electrolytic solution. Then, the negative electrode 2 was placed and piled through the membrane 3, and the vessel 6 was clamped to form a battery. A solution containing 1 mole/l of $Bu_4N \cdot ClO_4$ in distilled and dehydrated valeronitrile was used as the electrolytic solution.

In this battery, charging was conducted under a constant current (1.0 mA/cm²) in an argon atmosphere for 4 hours (the quantity of electricity corresponded to the doping quantity of 8 mole %). After termination of charging, discharging was carried out under a constant current (1.0 mA/cm²), and when the voltage was reduced 1 V, charging was carried out under the same conditions as described above. Thus, the charging-discharging test was conducted. The repetition frequency of charging-discharging conducted until the charging-discharging efficiency was reduced to 50% was 485 times.

Figure 2:
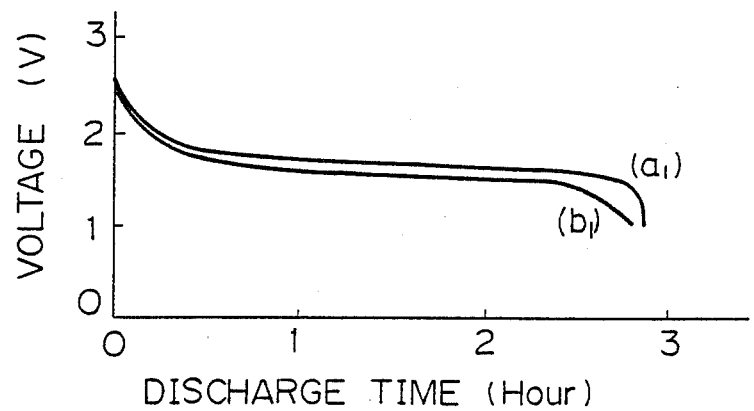
FIG. 2 shows curves of the relations between the discharge time and the voltage, which are observed in a battery of Example 2 of the present invention and a battery of Comparative Example 2.

The relation between the discharge time and the voltage at the 5th discharging at the above test is represented by curve $a_1$ in FIG. 2.

At the 5th charging-discharging, the energy density was 155 w·hr/kg, the charging-discharging efficiency was 98.0% and the self-discharge rate was 2.0%.

EXAMPLE 3

A battery was constructed in the same manner as that described in Example 2 except that the positive and negative electrodes were made of a swollen gel-like acetylene polymer containing no stainless steel net. Using this battery, the charging-discharging test was carried out in the same manner as described in Example 2.

The repetition frequency of charging-discharging conducted until the charging-discharging efficiency was reduced to 50% was 380 times. At the 5th charging-discharging, the energy density was 155 w·hr/kg, the charging-discharging efficiency was 92.0% and the self-discharge rate was 3%.

COMPARATIVE EXAMPLE 2

The charging-discharging test of the battery was carried out in the same manner as described in Example 2 except that propylene carbonate was used instead of valeronitrile as the solvent of the electrolytic solution. The relation between the discharge time and the voltage at the 5th discharging is shown by curve $b_1$ in FIG. 2. The repetition frequency of charging-discharging conducted until the charging-discharging efficiency was reduced to 50% was 108 times.

At the 5th charging-discharging, the energy density was 143 w·hr/kg, the charging-discharging efficiency was 92.0% and the self-discharge rate was 22%.

EXAMPLE 4

The battery test was carried out in the same manner as described in Example 1 except that molded articles having a size of 0.5 cm×2.0 cm prepared under a pressure of 1 ton/cm² from poly-p-phenylene obtained according to the process disclosed in Bull. Chem. Soc. Japan, 51, 2091 (1978) were used as the positive and negative electrodes. The voltage characteristics at the 205th discharging were substantially the same as those at the first discharging. The energy density of the battery was 142 w·hr/kg and the charging-discharging efficiency was 83%. When the battery was allowed to stand still in the charged state for 48 hours, the self-discharge rate was 9%.

COMPARATIVE EXAMPLE 3

The battery test was carried out in the same manner as described in Example 4 except that propylene carbonate was used instead of valeronitrile as the solvent of the electrolytic solution. The test became impossible at the 83rd charging-discharging. The energy density of the battery was 124 w hr/kg, and the charging-discharging efficiency was 68%. When the battery was allowed to stand in the charged state for 48 hours, the self-discharge rate was 31%.

EXAMPLE 5

The battery test was carried out in the same manner as described in Example 1 except that molded articles of a size of 0.5 cm×2.0 cm prepared under a pressure of 1 ton/cm² from poly(2,5-thienylene) obtained according to the process disclosed in J. Polym. Sci., Polym. Lett. Ed., 18, 9 (1980) were used as the positive and negative electrodes. The voltage characteristics at the 215th discharging were substantially the same as those at the first discharging. The energy density of the battery was 130 w·hr/kg and the charging-discharging efficiency was 74%. When the battey was allowed to stand in the charged state for 48 hours, the self-discharge rate was 11%.

COMPARATIVE EXAMPLE 4

The battery test was carried out in the same manner as described in Example 5 except that propylene carbonate was used instead of valeronitrile as the solvent of the electrolytic solution. The test became impossible at the 53rd charging-discharging. The energy density of the battery was 95 w·hr/kg and the charging-discharging efficiency was 52%. When the battery was allowed to stand in the charged state for 48 hours, the self-discharge rate was 29%.

EXAMPLE 6

[Battery Test]

The battery test was carried out in the same manner as described in Example 2 except that the composite product used as the electrode in Example 2 was used as the positive electrode and a disc of graphite having a thickness of 200 μm was used as the negative electrode.

The repetition frequency of charging-discharging conducted until the charging-discharging efficiency was reduced to 50% was 192 times. At the 5th charging-discharging, the charging-discharging efficiency was 94% and the energy density was 142 w·hr/kg of the active material.

COMPARATIVE EXAMPLE 5

The battery test was carried out in the same manner as described in Example 6 except that propylene carbonate was used instead of valeronitrile as the solvent of the electrolytic solution. The repetition frequency of charging-discharging conducted until the charging-discharging efficiency was reduced to 50% was 260 times. At the 5th charging-discharging, the charging-discharging efficiency was 92% and the energy density was 133 w·hr/kg of the active material.

EXAMPLES 7 THROUGH 14 AND COMPARATIVE EXAMPLE 6

The battery test was carried out in the same manner as described in Example 1 except that an aliphatic nitrile shown in Table 1 was used instead of valeronitrile as the solvent of the electrolytic solution. The obtained results are shown in Table 1.

Incidentally, the cycle life in Table 1 indicates the repetition frequency of charging-discharging conducted until the charging-discharging efficiency was reduced to 50%.

TABLE 1

| Example No. | Solvent | Energy Density (w·hr/kg) | Cycle Life (times) | Self-Discharge Rate (%) |
|---|---|---|---|---|
| 7 | Cyclohexane carbonitrile | 142 | 332 | 6 |
| 8 | 4-Methylvaleronitrile | 152 | 335 | 6 |
| 9 | Butyronitrile | 158 | 280 | 7 |
| 10 | Octane nitrile | 135 | 250 | 8 |
| 11 | Succinonitrile (60)/acetonitrile (40) | 138 | 245 | 9 |
| 12 | 3-Methoxypropionitrile | 135 | 240 | 11 |
| 13 | Valeronitrile (60)/acetonitrile (40) | 152 | 320 | 11 |
| 14 | 4-Methylvaleronitrile (60)/propylene carbonate (40) | 138 | 205 | 12 |
| Comparative Example 6 | Acetonitrile | 121 | 83 | 36 |

Incidentally, each parenthesized value indicates the amount (parts by weight).

EXAMPLE 15

Test pieces having a width of 0.5 cm and a length of 2.0 cm were cut out from a filmy acetylene high polymer having a thickness of 100 μm and a bulk density of 0.30 g/cc, which was prepared according to the process described in Example 1. Two test pieces were mechanically press-secured to different platinum wires to form positive and negative electrodes. A benzonitrile solution having a $(Bu_4N)^+(PF_6)^-$ concentration of 0.5 mole/l was used as the electrolytic solution, and charging was carried out under a constant current (1.0 mA/cm$^2$) for 30 minutes (the amount of electricity corresponded to the doping quantity of 8 mole %). Immediately after termination of charging, discharging was carried out under a constant current (1.0 mA/cm$^2$), and when the voltage was reduced to 1 V, charging was carried out under the same conditions as described above. In this manner, the charging-discharging repetition test was conducted. The voltage characteristics at the 250th charging-discharging was substantially the same as those at the 2nd or 3rd charging-discharging.

The energy density was 152 w·hr/kg of the active material used, and the charging-discharging efficiency was 95%. The ratio of the amount of electricity discharged until the voltage was reduced to 1.0 V at the discharging step, to the total amount of electricity discharged was 92%.

When the battery was allowed to stand in the charged state for 48 hours, the self-discharge rate was 5%. The repetition frequency of charging-discharging conducted until the charging-discharging efficiency was reduced to 50% was 308 times.

COMPARATIVE EXAMPLE 7

The charging-discharging repetition test was carried out in the same manner as described in Example 15 except that tetrahydrofuran was used instead of benzonitrile as the organic solvent of the electrolytic solution. When charging-discharging was repeated 41 times, charging became impossible. When the filmy acetylene high polymer was taken out after the test, it was found that the film was broken. When a part of the film was subjected to the elementary analysis and infrared spectrum analysis, it was found that the film was drastically deteriorated. The electrolytic solution was colored brown.

The energy density was 133 w·hr/kg of the active material, and the charging-discharging efficiency was 83%. The ratio of the amount of electricity discharged until the voltage was reduced to 1.0 V, to the total amount of electricity discharged was 66%. When the battery was allowed to stand in the charged state for 48 hours, the self-discharge rate was 28%. The repetition frequency of charging-discharging conducted until the charging-discharging efficiency was reduced to 50% was 91 times.

EXAMPLE 16

A 100-mesh stainless steel net was placed in a glass reaction vessel having an inner capacity of 1 liter, the inside atmosphere of which was completely replaced by nitrogen gas, and 100 ml of refined toluene was charged as the polymerization solvent and 4.41 millimoles of tetrabutoxy titanium and 11.01 millimoles of triethyl aluminum were charged into the reaction vessel at room temperature of form a catalyst solution. The catalyst solution was homogeneous. The reaction vessel was cooled by liquid nitrogen and nitrogen gas in the reaction vessel was removed by a vacuum pump. The reaction vessel was cooled to −78° C., and refined acetylene gas maintained under a pressure of 1 atmosphere was blown into the reaction vessel while the catalyst solution was kept stationary. The polymerization was conducted for 10 hours while maintaining the acetylene gas pressure at 1 atmosphere. The reaction product was a reddish violet gel-like product. Unreacted acetylene gas was removed after termination of the polymerization, and the reaction product was washed repeatedly with 200 ml of refined toluene 4 times while maintaining the temperature at −78° C., to obtain a stainless steel net-containing sheet-like swollen acetylene high polymer swollen with toluene and having a thickness of about 0.5 cm. In the thus-obtained swollen acetylene high polymer, fibrous fine crystals (fibrils) having a diameter of 300 to 500 angstroms were regularly entangled with one another, and no powdery or bulky polymer was found.

This stainless steel net-containing sheet-like swollen acetylene high polymer was inserted between chromium-deposited ferro type plates and preliminarily pressed under a pressure of 100 kg/cm$^2$ at room temperature. Then, the polymer was pressed under a high pressure of 15 ton/cm$^2$ to obtain a uniform flexible composite product having a metallic gloss and a reddish brown color and having a thickness of 280 $\mu$m. The composite product was vaccum-dried at room temperature for 5 hours. The composite product contained 43% by weight of the stainless steel net.

[Battery Test]

Two discs having a diameter of 20 mm were cut out from the composite product obtained according to the above-mentioned process, and by using these discs as the positive electrode active material and negative electrode active material and a solution of 1 mole/l of Bu$_4$N.BF$_4$ in distilled and dehydrated benzonitrile as the electrolytic solution, a secondary battery as shown in FIG. 1 was prepared in the same manner as described in Example 2.

By using the so-constructed batter, in an argon atmosphere, charging was carried out under a constant current (1.0 mA/cm$^2$) for 4 hours (the amount of electricity corresponded to the doping quantity of 8 mole %). Immediately after termination of charging, discharging was carried out under a constant current (1.0 mA/cm$^2$) and when the voltage was reduced to 1 V, charging was conducted again under the same conditions as described above. Thus, the charging-discharging repetition test was conducted. The repetition frequency of charging-discharging conducted until the charging-discharging efficiency was reduced to 50% was 520 times.

Figure 3:
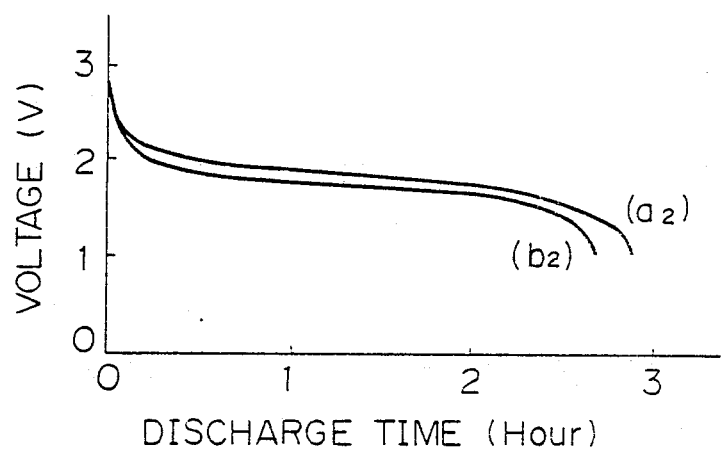
FIG. 3 shows curves of the relations between the discharge time and the voltage, which are observed in a battery of Example 15 of the present invention and a battery of Comparative Example 8.

The relation between the discharge time and the voltage at the 5th discharging at this charging-discharging repetition test is indicated by curve a$_2$ in FIG. 3.

At the 5th charging-discharging, the energy density was 157 w·hr/kg, the charging-discharging efficiency was 99.0% and the self-discharge rate was 1.5%.

EXAMPLE 17

A battery was constructed in the same manner as that described in Example 16 except that the positive and negative electrodes were made of a swollen gel-like acetylene polymer containing no stainless steel net. Using this battery, the charging-discharging test was carried out in the same manner as described in Example 16.

The repetition frequency of charging-discharging conducted until the charging-discharging efficiency was reduced to 50% was 405 times. At the 5th charging-discharging, the energy density was 157 w·hr/kg, the charging-discharging efficiency was 98.5% and the self-discharge rate was 2%.

COMPARATIVE EXAMPLE 8

The charging-discharging repetition test was carried out in the same manner as described in Example 16 except that propylene carbonate was used instead of benzonitrile as the organic solvent of the electrolytic solution of the battery. The relation between the discharge time and the voltage at the 5th charging-discharging is indicated by curve b$_2$ in FIG. 3. The repetition frequency of charging-discharging conducted until the charging-discharging efficiency was reduced to 50% was 108 times.

At the 5th charging-discharging, the energy density was 141 w·hr/kg, the charging-discharging efficiency was 92.0% and the self-discharge rate was 21%.

EXAMPLE 18

Molded articles having a size of 0.5 cm×2.0 cm, which were prepared under a pressure of 1 ton/cm$^2$ from poly-p-phenylene obtained according to the process disclosed in Bull. Chem. Soc. Japan, 51, 2091 (1978), were used as the positive and negative electrodes, and the battery test was carried out in the same manner as described in Example 15. The voltage characteristics at the 199th charging-discharging were substantially the same as those at the first discharging. The energy density of the battery was 147 w·hr/kg and the charging-discharging efficiency was 82%. When the battery was allowed to stand in the charged state for 48 hours, the self-discharge rate was 8%.

COMPARATIVE EXAMPLE 9

The battery test was carried out in the same manner as described in Example 18 except that propylene carbonate was used instead of benzonitrile as the solvent of the electrolytic solution. At the 60th charging-discharging, the test became impossible. The energy density of the battery was 125 w·hr/kg and the charging-discharging efficiency was 67%. When the battery was allowed to stand in the charged state for 48 hours, the self-discharge rate was 33%.

EXAMPLE 19

Molded articles of a size of 0.5 cm×2.0 cm prepared under a pressure of 1 ton/cm$^2$ from poly(2,5-thienylene) obtained according to the process disclosed in J. Polym. Sci., Polym. Lett. Ed., 18, 9 (1980) were used as the positive and negative electrodes, and the battery test was carried out in the same manner as described in Example 15. The voltage characteristics at the 211th charging-discharging were substantially the same as those at the first discharging. The energy density of this battery was 126 w·hr/kg and the charging-discharging efficiency was 76%. When the battery was allowed to stand in the charged state for 48 hours, the self-discharge rate was 11%.

COMPARATIVE EXAMPLE 10

The battery test was carried out in the same manner as described in Example 19 except that propylene carbonate was used instead of benzonitrile as the solvent of the electrolytic solution of the battery. At the 53rd charging-discharging, the test became impossible. The energy density of the battery was 95 w·hr/kg, and the charging-discharging efficiency was 52%. When the battery was allowed to stand in the charged state for 48 hours, the self-discharge rate was 29%.

EXAMPLE 20 THROUGH 26

The battery test was carried out in the same manner as described in Example 15 except that an aromatic nitrile compound shown in Table 2 was used instead of benzonitrile as the solvent of the electrolytic solution. The obtained results are shown in Table 2.

TABLE 2

| Example No. | Solvent | Energy Density (w·hr/kg) | Cycle Life** (times) | Self-Discharge Rate (%) |
|---|---|---|---|---|
| 20 | Phthalodinitrile | 150 | 285 | 6 |
| 21 | o-Tolunitrile | 149 | 327 | 9 |
| 22 | p-Methoxyphenyl-acetonitrile | 150 | 306 | 8 |
| 23 | N—(2-cyanoethyl)-N—methylaniline | 148 | 238 | 7 |
| 24 | Mixed solvent of benzonitrile (60*) and propylene carbonate (40*) | 142 | 221 | 12 |
| 25 | 3-Phenoxypropionitrile | 139 | 187 | 14 |
| 26 | M—tolunitrile | 149 | 351 | 5 |

Note
*each parenthesized value indicates the amount (parts by weight)
**The repetition frequency of charging-discharging conducted until the charging-discharging efficiency was reduced to 50%

EXAMPLE 27

The battery test was carried out in the same manner as described in Example 15 by using as the positive electrode a test piece having a width of 0.5 cm and a length of 2.0 cm, which was cut from polypyrrole prepared according to the process disclosed in Bull. Chem. Soc. Jpn., 56, 985–990 (1983), and the same acetylene high polymer as prepared in Example 1 for the negative electrode. The voltage characteristics at the 212th discharging were substantially the same as those at the first discharging. The energy density of the battery was 147 w·hr/kg, and the charging-discharging efficiency was 94% at the 5th charging-discharging. When the battery was allowed to stand in the charged state for 48 hours, the self-discharge rate was 6%.

COMPARATIVE EXAMPLE 11

The battery test was carried out in the same manner as described in Example 27 except that propylene carbonate was used as the solvent of the electrolytic solution instead of benzonitrile. At the 76th charging-discharging, the test became impossible. The energy density of the battery was 115 w·hr/kg and the charging-discharging efficiency was 74% at the 5th charging-discharging. When the battery was allowed to stand in the charged state for 48 hours, the self-discharge rate was 27%.

EXAMPLE 28

The battery test was carried out in the same manner as described in Example 15 by using the same poly(2,5-thienylene) as used in Example 5 for the positive electrode and the same acetylene high polymer as used in Example 1 for the negative electrode. The voltage characteristics at the 318th discharging were substantially the same as those at the first discharging. The charging-discharging efficiency at the 5th charging-discharging was higher than 99%. The repetition frequency of charging-discharging conducted until the charging-discharging efficiency was reduced to 50% was 590 times. The energy density at the 5th charging-discharging was 148 w·hr/kg. When the battery was allowed to stand in the charged state for 48 hours, the self-discharge rate was 4%.

COMPARATIVE EXAMPLE 12

The battery test was carried out in the same manner as described in Example 28 except that propylene carbonate was used instead of benzonitrile as the solvent of the electrolytic solution. When the charging-discharging was repeated 97 times, the test became impossible. The energy density was 128 w·hr/kg and the charging-discharging efficiency at the 5th charging-discharging was 84%. When the battery was allowed to stand in the charged state for 48 hours, the self-discharge rate was 25%.

EXAMPLE 29

Ti (having a purity of 99.5%) was mixed with S (having a purity of 99.9999%) at a molar ratio of ½, and the mixture was vacuum-sealed in a quartz ampoule, heated at 600° C. for 1 week and naturally cooled. Teflon was dispersed into the thus-obtained $TiS_2$ powder to form a Teflon dispersion having a Teflon concentration of 10% by weight. The dispersion was mixed with 10% by weight of graphite and the mixture was molded into a test piece having a width of 0.5 cm and a length of 2.0 cm. A battery was constructed in the same manner as described in Example 1 by using this test piece as the positive electrode and the same acetylene high polymer as used in Example 1 for the negative electrode. A benzonitrile solution of $LiClO_4$ having a concentration of 0.5 mole/l was used as the electrolytic solution.

The battery test was carried out in the same manner as described in Example 15. The voltage characteristics at the 250th discharging were substantially the same as those at the first discharging. The charging-discharging efficiency at the 5th charging-discharging was 98.5%. The repetition frequency of charging-discharging conducted until the charging-discharging efficiency was reduced to 50% was 620 times. The energy density of the battery was 129 w·hr/kg. When the battery was allowed to stand in the charged state for 48 hours, the self-discharge rate was 3%.

COMPARATIVE EXAMPLE 13

The battery test was carried out in the same manner as described in Example 29 except that propylene carbonate was used instead of benzonitrile as the solvent of the electrolytic solution. When charging-discharging was repeated 82 times, the test became impossible. The energy density of the battery was 112 w·hr/kg. The charging-discharging efficiency at the 5th charging-discharging was 85%. When the battery was allowed to stand in the charged state for 48 hours, the self-discharge rate was 15%.

EXAMPLE 30

The battery test was carried out in the same manner as described in Example 15 by using polyphenylquinoline prepared according to the process disclosed in Japanese Unexamined Patent Publication No. 57-195731 for the negative electrode and the same acetylene high polymer as used in Example 1 for the positive electrode. The voltage characteristics at the 185th discharging were substantially the same as those at the first discharging. The repetition frequency of charging-discharging conducted until the charging-discharging efficiency was reduced to 50% was 275 times. The energy density at the 5th charging-discharging was 142 w·hr/kg. When the battery was allowed to stand in the charged state for 48 hours, the self-discharge rate was 6%.

COMPARATIVE EXAMPLE 14

The battery test was carried out in the same manner as described in Example 30 except that propylene carbonate was used instead of benzonitrile as the solvent of the electrolytic solution. When the charging-discharging was repeated 65 times, the test became impossible. The energy density of the battery was 125 w·hr/kg and the charging-discharging efficiency at the 5th charging-discharging was 74%. When the battery was allowed to stand in the charged state for 48 hours, the self-discharge rate was 39%.

We claim:

1. A battery comprising as at least one electrode a polymeric compound having conjugated double bonds in the main chain, and an electrolytic solution comprising an organic solvent and an electrolyte therein, said organic solvent being at least one member selected from the group consisting of nitrile compounds represented by the following general formulae (I) and (II):

$$R-CN \qquad (I)$$

wherein R stands for an alkyl group having 2 to 7 carbon atoms, a saturated alicyclic hydrocarbon residue having 3 to 7 carbon atoms or a group $CH_3-(CH_2)_x-O-(CH_2-)_y$ or $NC-(CH_2-)_z$ in which x, y and z stand for 0 or a positive integer of up to 5, and

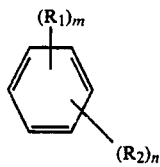

(II)

wherein $R_1$ stands for a group $-(CH_2)_p-CN$, $-O-(CH_2)_q-CN$ or

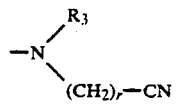

in which $R_3$ stands for an alkyl group having up to 5 carbon atoms and p, q and r stand for 0 or a positive integer of up to 5, $R_2$ stands for an alkyl or alkoxy group having up to 5 carbon atoms or a group $-(-CH_2-)_l-CN$, in which l stands for 0 or a positive integer of up to 3, m is a positive integer of up to 3, and n is 0 or a positive integer of up to 3.

2. A battery according to claim 1, wherein the polymeric compound having conjugated double bonds in the main chain is polyacetylene.

3. A battery according to claim 1, wherein the polymeric compound having conjugated double bonds in the main chain is polythiophene.

4. A battery according to claim 1, wherein the polymeric compound having conjugated double bonds in the main chain is polypyrrole.

5. A battery according to claim 1, wherein the polymeric compound having conjugated double bonds in the main chain is poly-p-phenylene.

6. A battery according to claim 1, which comprises a positive electrode made of polyacetylene and a negative electrode made of polyacetylene.

7. A battery according to claim 1, which comprises a positive electrode made of poly(2,5-thienylene) and a negative electrode made of polyacetylene.

8. A battery according to claim 1, which comprises a positive electrode made of polypyrrole and a negative electrode made of polyacetylene.

9. A battery according to claim 1, which comprises $TiS_2$ as a positive electrode active material and polyacetylene as a negative electrode.

10. A battery according to claim 1, which comprises polyacetylene as a positive electrode and polyphenylquinoline as a negative electrode.

11. A battery according to claim 1, which comprises a composite material of polyacetylene with polythiophene or polypyrrole as a positive electrode and polyacetylene as a negative electrode.

12. A battery according to claim 1, wherein the organic solvent in an electrolytic solution is selected from the group consisting of benzonitrile, m-tolunitrile and valeronitrile.

13. A battery according to claim 1 wherein said electrolyte comprises a cation and an anion, said cation being selected from the group consisting of:
(a) lithium ion, sodium ion, and potassium ion;
(b) quaternary ammonium ions represented by the formula: $R_4N^+$ wherein R is a hydrocarbon group having 1 to 20 carbon atoms;
(c) pyrylium and pyridinium cations represented by the following formula (III):

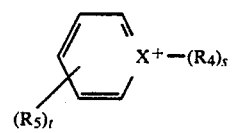

(III)

wherein X is an oxygen atom or nitrogen atom, $R_4$ is a hydrogen atom, an alkyl group having 1 to 15 carbon atoms or an aryl group having 6 to 15 carbon atoms, $R_5$ is a halogen atom, an alkyl group having 1 to 10 carbon atoms or an aryl group having 6 to 15 carbon atoms, s is 0 when X is an oxygen atom or s is 1 when X is a nitrogen atom, and t is 0 or a number of from 1 to 5; and
(d) carbonium cations represented by the following formulae (IV) and (V):

(IV)

wherein $R^6$, $R^7$, and $R^8$ are a hydrogen atom, an alkyl group having 1 to 15 carbon atoms, an allyl group, an aryl group having 6 to 15 carbon atoms or a group —OR$^{10}$ in which R$^{10}$ is an alkyl group having 1 to 10 carbon atoms or an aryl group having 6 to 15 carbon atoms, with the proviso that the case where all of R$^6$, R$^7$ and R$^8$ are hydrogen atoms is excluded,

   (V)

wherein R$^9$ is a hydrogen atom, an alkyl group having 1 to 15 carbon atoms or an aryl group having 6 to 15 carbon atoms;
and said anion being selected from the group consisting of:
  (i) anions of halides of elements of the groups IIIa and Va of the periodic table,
  (ii) halogen anions,
  (iii) perchloric acid anions, and
  (iv) a HF$_2^-$ anion.

14. A battery according to claim 13, wherein said pyrylium and pyridium cations of the formula (III) are selected from the group consisting of:

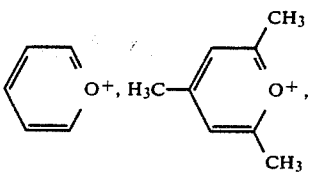

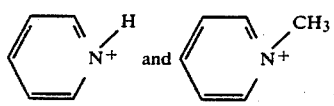

15. A battery according to claim 13, wherein said carbonium cations of the formulae (IV) and (V) are selected from the group consisting of:

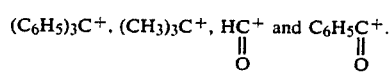

16. A battery according to claim 13, wherein said anions of halides of elements of the groups IIIa and Va of the periodic table are selected from the group consisting of BF$_4^-$, PF$_6^-$, SbF$_6^-$, AsF$_6^-$ and SbCl$_6^-$.

17. A battery according to claim 13, wherein said halogen anions are selected from the group consisting of I$^-$, Br$^-$ and Cl$^-$.

* * * * *